United States Patent [19]

Moesgaard

[11] Patent Number: 4,670,808
[45] Date of Patent: Jun. 2, 1987

[54] CLEANING CASSETTE FOR USE IN A CASSETTE TAPE RECORDER

[75] Inventor: Anders Moesgaard, Klampenborg, Denmark

[73] Assignee: AM/KEMI A/S, Kokkedal, Denmark

[21] Appl. No.: 702,234

[22] PCT Filed: May 17, 1984

[86] PCT No.: PCT/DK84/00041
§ 371 Date: Jan. 16, 1985
§ 102(e) Date: Jan. 16, 1985

[87] PCT Pub. No.: WO84/04840
PCT Pub. Date: Dec. 6, 1984

[30] Foreign Application Priority Data

May 20, 1983 [DK] Denmark .............................. 2273/83

[51] Int. Cl.$^4$ ............................................. G11B 5/41
[52] U.S. Cl. .................................... 360/128; 360/137; 15/210 R
[58] Field of Search .............. 360/128, 137; 15/210 R

[56] References Cited

U.S. PATENT DOCUMENTS

| | | | |
|---|---|---|---|
| 3,761,994 | 10/1973 | Becht | 15/210 R |
| 3,955,214 | 5/1976 | Post et al. | 360/128 |
| 4,141,053 | 2/1979 | Kara | 360/128 |
| 4,149,206 | 4/1979 | Loiselle | 360/128 |
| 4,272,796 | 6/1981 | Van Kreuningen | 360/128 |
| 4,454,551 | 6/1984 | Clausen et al. | 360/128 X |

FOREIGN PATENT DOCUMENTS

| | | |
|---|---|---|
| 114115 | 7/1984 | European Pat. Off. ............ 360/128 |
| 1937152 | 2/1971 | Fed. Rep. of Germany . |
| 3212730 | 9/1983 | Fed. Rep. of Germany . |
| 1319948 | 6/1973 | United Kingdom . |
| 2086639 | 5/1982 | United Kingdom . |
| 2120829 | 12/1983 | United Kingdom . |

Primary Examiner—John H. Wolff
Attorney, Agent, or Firm—Burns, Doane, Swecker & Mathis

[57] ABSTRACT

A clean cassette for cassette tape recorders comprising a holder for a cleaning member, which holder is pivotally connected at one end with a spring-biased pivot arm. The opposite end of the spring-biased pivot arm engages a cam device which in the operative position of the cassette is engaged by one coil shaft of the tape recorder. The opposite end of the holder is intermittently engageable with a second pivot arm. The second pivot arm is influenced in the operative position by a second cam device engaged by the second coil shaft of the tape recorder. Upon actuation of the second coil shaft, an end of the second pivot arm moves the holder against the action of the spring bias of the first pivot arm.

5 Claims, 1 Drawing Figure

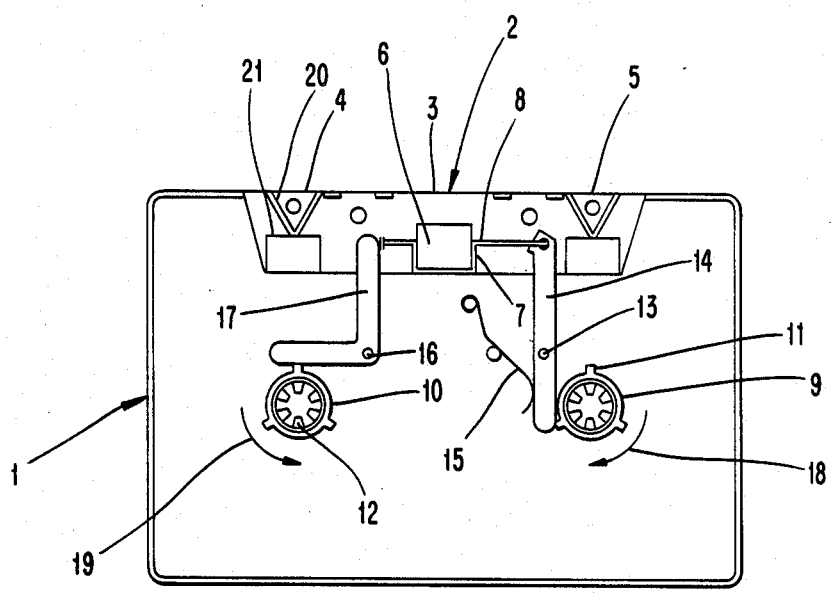

CLEANING CASSETTE FOR USE IN A CASSETTE TAPE RECORDER

FIELD OF THE INVENTION

The present relates to cleaning cassettes for use in a cassette tape recorders generally and more particularly, to cleaning cassettes having a cleaning member which undergoes movement during cleaning operations.

BACKGROUND OF THE INVENTION

From DE-A-1,937,152 and U.S. Pat. Nos. 3,955,214 and 4,149,206 cleaning cassettes of this kind are known, in which the drive means for the movable cleaning member, i.e. the pivot arm and the cam device, are brought into engagement with one of the coil shafts of the tape recorder introduced into the cassette casing in the operative position of the cassette. In non-reversing cassette tape recorders, in which only the shaft for the winding coil of a usual tape cassette is in drive connection with the motor of the tape recorder, the cleaning function with such cassettes can only be obtained by correct orientation of the cleaning cassette when in position in the cassette chamber of the tape recorder. For tape recorders having an automatic stop function erroneous positioning will cause stopping of the tape recorder and/or ejection of the cleaning cassette to the discomfort and irritation of the user.

From DK-A-4683/81 a cleaning cassette is known, in which this operational disadvantage is remedied by a double drive arrangement for the cleaning member in the form of a gear drive with two gears journalled in the cassette to enter into drive connection with respective ones of the coil shafts of the tape recorder in the operative position and an intermediate gear engaging both of said gears and being connected with an eccentric cam device acting on the pivot arm for the cleaning member.

Thereby, the operation is facilitated so that a correct cleaning function is obtained independent of the orientation of the cleaning cassette, when it is positioned in the tape recorder, this being obtained, however, at the expense of a more complicated and expensive construction which, moreover, as a result of the drive connection established through the gear drive has the disadvantage that the motor of the tape recorder shall operate through the driven shaft for the winding coil not only the drive arrangement in the cleaning cassette but also the shaft of the tape recorder for the feed or unwinding coil and the transmission members connected therewith. In case of excessive friction in the gear drive or the cleaning movement this may cause stopping of the tape recorder.

OBJECTS AND SUMMARY OF THE INVENTION

It is the object of the invention to remedy the operational disadvantages of non-reversing cleaning cassettes with a simpler and cheaper construction with which no drive connection from the driven to the non-driven coil shaft of the tape recorder is established in use of the cleaning cassette.

In order to achieve this object, a cleaning cassette according to the invention is characterized in that the holder for the cleaning member is pivotally connected with said pivot arm in one end, whereas in the other end it engages a further pivot arm which in said operative position is influencable by a second cam device engaging the other coil shaft of the tape recorder to perform a pivotal movement by rotation of said cam device, whereby the holder is caused to move against the spring-bias acting on the first pivot arm.

BRIEF DESCRIPTION OF THE DRAWING

The invention will be further explained with reference to the drawing which is a side view of a cleaning cassette constructed according to a preferred embodiment of the invention.

DETAILED DESCRIPTION OF THE PREFERRED EMBODIMENT

The cleaning cassette according to a preferred embodiment of the present invention has a cassette casing 1 of the same shape and proportions as a usual tape cassette. In one longitudinal side 2 of the casing 1, openings 3, 4 and 5 are provided in a usual manner through which the recording/reproducing head, the capstan and the pinch roller of the tape recorder is brought into engagement with cleaning members in the cassette.

The cleaning member for the recording/reproducing head comprises a cleaning body 6, such as a felt body, arranged in a holder 7 which is journalled in the cassette casing 1 to be able to perform a reciprocating cleaning movement parallel to the longitudinal side 2. To this end, the holder 7 may have a front plate 8 with protruding longitudinal edges engaging guide tracks in the major side walls of the cassette casing.

In usual manner the cassette casing 1 is provided with openings for introduction of each of the coil shafts of the tape recorder. In the embodiment shown, cam devices 9 and 10, respectively, are arranged concentrically in a respective one of said openings, each of said cam devices having a circular cross section and three protruding cams 11. For engagement with the coil shafts, each cam device has an internal bore with ribs 12.

One end of the front plate 8 of the holder 7 is pivotally connected with one end of a pivot arm 14 journalled pivotally on a pivot pin 13, the opposite end of said pivot arm 14 being biased towards engagement with the cam device 9 by a spring 15.

The opposite end of the front plate 8 of the holder 7 forms an abutment for one end of a second pivot arm 17 journalled pivotally on a pivot pin 16. The opposite end of the pivot arm 17 engages the cam device 10.

The parts of pivot arms 14 and 17 engaging cam devices 9 and 10, respectively, are shaped and positioned in such a manner relative to the cam devices 9 and 10 that the spring-bias keeping pivot arm 14 into engagement with the cam device 9 will press the front plate 8 into engagement with the end of pivot arm 17 and will thereby in the position shown keep the latter into engagement with the cam device 10.

If the cassette is positioned in operative position in the cassette chamber of a tape recorder with the cam device 9 engaging the driven shaft, the rotation of the cam device 9 in the direction shown by an arrow 18 will act on pivot arm 14 against the bias from spring 15 each time the pivot arm 14 is passed by one of the cams 11. Thereby, in the embodiment shown, in which the pivot arm 17 engages the front plate 8 without being connected therewith, the holder 7 will perform a linear movement to the right without being followed by the pivot arm 17, and after the passage of pivot arm 14 it will return to the illustrated rest position as a result of the spring bias. Even if the pivot arm 17 was connected with the front plate 8 and, thus, influenced to pivotal movement by the reciprocating movement of the holder 7, such a movement would not result in any rotary movement of the cam device 10.

If the cassette is positioned inversely in the tape recorder with the cam device 10 into engagement with driven shaft of the tape recorder, the rotation of the cam device 10 in the direction shown by an arrow 19 will in a corresponding manner act on the pivot arm 17 at each passage of one of the cams 11 and, thereby, the pivot arm 17 will move the holder 7 to the right, whereby the pivot arm 14 is influenced against the spring bias. After passage of the cam 11 in question, the cam device 10 will be returned to the illustrated rest position as a result of the return movement caused by the spring bias through the pivot arm 14 and the holder 7. However, reciprocating movement of pivot arm will not result in any movement of the cam device or the shaft of the tape recorder in engagement therewith, which in this case is the non-driven shaft.

Thus, independent of the orientation of the cassette a reliable cleaning function is obtained without any drive connection being established through the cassette from the driven to the non-driven coil shaft of the tape recorder.

In the embodiment shown, pivot arms 14 and 17 engage separate, non-eccentric cam devices 9 and 10 positioned the cassette and having protruding cams 11. However, eccentric cam devices of the kind known from the patent specifications mentioned hereinbefore may also be used. In some types of tape recorders, the coil shafts themselves may even operate as cam devices, so that the separate cam devices 9 and 10 may be dispensed with.

For the cleaning of the pinch roller and capstan of the tape recorder, the cleaning cassette may, in a manner known per se, have separate cleaning elements 20 which may have the form, for example, of a felt body bent into U-shape and inserted in a holder 21 which is retractable from the cassette to enable replacement of this cleaning element which under use is subjected to a rather heavy contamination.

It is to be understood that the present invention may be embodied in other specific forms without departing from the spirit or essential characteristics of the present invention. The preferred embodiment is therefore to be considered illustrative and no restrictive. The scope of the invention is indicated by the appended claims rather than by the foregoing descriptions and all changes or variations which fall within the meaning and range of the claims are therefore intended to be embraced therein.

What is claimed is:

1. A cleaning cassette for use in a cassette tape recorder for the cleaning of a recording/reproducing head thereof, said recorder having a first and a second coil shaft for engagement with each of two coil drive members of a tape cassette, said cleaning cassette comprising a cassette casing in which a spring-biased pivot arm is pivotally journalled and is influenced in the operative position of the cleaning cassette in a tape recorder by a cam device adapted to engage one of the coil shafts of the tape recorder, said pivot arm being connected with a holder of a cleaning member, said cleaning member adapted to engage the recording/reproducing head in said operative position, said holder journalled in the cleaning cassette casing for linear reciprocating movement along a path parallel to a longitudinal side of said cassette casing so as to cause said cleaning member to undergo a cleaning movement relative to the recording-/reproducing head by the pivotal movement of the pivot arm caused by rotation of said cam device, one end portion the holder pivotally connected with said pivot arm, the other end portion of said holder intermittently engageable by a second pivot arm, said second pivot arm in said operative position influenceable by a second cam device adapted to engage the other coil shaft of the tape recorder, said second pivot arm adapted to perform a pivotal movement upon rotation of said second cam device and to move the holder against the spring-bias acting on the first pivot arm.

2. The cleaning cassette as claimed in claim 1, wherein each of said cam devices is of circular cross section and is adapted to concentrically engage in said operative position with a respective one of the coil drive shafts introduced in said cassette casing, each of said cam devices provided with a number of cams along a surface engaging the respective pivot arm.

3. The cleaning cassette as claimed in claim 2, wherein said cam devices comprise the coil drive shafts introduced in the cassette casing in the operative position.

4. A cleaning cassette comprising:
a cassette body provided with a mechanism having a cleaning body attached to a reciprocable holder, whose action is suitable for a cleaning magnetic head, said mechanism further including,
a first arm, one end of which is pivotally secured to one end of said holder, with the other end of said first arm provided with biasing means for fictionally engaging a first cam, said first cam engageable coaxially with a first cassette engaging drive means, said first arm central portion being pivotally secured to the cassette body,
a second arm having a central portion pivotally secured to the cassette body, one end of said second arm intermittently spaced from the other end of said holder with the other end of said second arm being intermittently pivotable by action of a second cam engageable coaxially with a second cassette engaging drive means, whereby operation of said second drive means causes intermittent contact between said second arm and the other end of said support beam, against the action of said biasing means,
so that upon activation of either one of the first and second cassette engaging drive means, the holder and the cleaning body are reciprocated.

5. A cleaning cassette for use in a device having first and second cassette-drive means, comprising:
a cassette body;
a holder provided with a cleaning body, said holder reciprocable relative to said cassette body;
first and second cams adapted to receive the first and second cassette-drive means;
a first arm including a first end portion pivotally connected to one end portion of said holder, an opposite end portion adjacent said first cam and an intermediate portion pivotally connected with said cassette body;
biasing means for urging said opposite end portion into frictional engagement with said first cam;
a second arm including a first end portion adjacent the other end portion of said holder, an opposite end portion located adjacent said second cam and an intermediate portion pivotally connected with said cassette body such that operation of said second cam causes said first end portion of said second arm to intermittently move the holder against the action of said biasing means, whereby either one of said first and second cams may be operated to reciprocate said holder with the other cam remaining in an unoperated condition.

* * * * *